(12) United States Patent
Wang et al.

(10) Patent No.: US 12,282,849 B2
(45) Date of Patent: Apr. 22, 2025

(54) METHOD FOR TRAINING CLASSIFICATION MODEL, CLASSIFICATION METHOD, APPARATUS AND DEVICE

(71) Applicant: Beijing Baidu Netcom Science Technology Co., Ltd., Beijing (CN)

(72) Inventors: Yaqing Wang, Beijing (CN); Dejing Dou, Beijing (CN)

(73) Assignee: Beijing Baidu Netcom Science Technology Co., Ltd., Beijing (CN)

(*) Notice: Subject to any disclaimer, the term of this patent is extended or adjusted under 35 U.S.C. 154(b) by 981 days.

(21) Appl. No.: 17/349,280

(22) Filed: Jun. 16, 2021

(65) Prior Publication Data

US 2021/0312288 A1    Oct. 7, 2021

(30) Foreign Application Priority Data

Dec. 28, 2020   (CN) ......................... 202011595164.5

(51) Int. Cl.
*G06N 3/04*    (2023.01)
*G06N 3/045*   (2023.01)
*G06N 3/08*    (2023.01)

(52) U.S. Cl.
CPC ............. *G06N 3/08* (2013.01); *G06N 3/045* (2023.01)

(58) Field of Classification Search
CPC .......... G06N 3/08; G06N 3/0895; G06N 3/09; G06N 3/091; G06N 3/094; G06N 3/096;
(Continued)

(56) References Cited

U.S. PATENT DOCUMENTS 11,636,286 B1 *    4/2023   Goldenberg ......... G06V 10/809
                                                         382/157
2018/0365591 A1   12/2018   Cucci et al.
(Continued)

FOREIGN PATENT DOCUMENTS

CN    107274020 A    10/2017
CN    108182489 A     6/2018
(Continued)

OTHER PUBLICATIONS

Gharavi, E. and Veisi, H., (2020), "Improve document embedding for text categorization through deep siamese neural network", arXiv preprint arXiv:2006.00572 (Year: 2020).*
(Continued)

*Primary Examiner* — Hal Schnee
(74) *Attorney, Agent, or Firm* — Tucker Ellis LLP (57) ABSTRACT

The present application discloses a method for training a classification model, a classification method, an apparatus and a device. A specific implementation is: acquiring behavior information of multiple users and personal basic information of the multiple users; where categories of at least part of users of the multiple users are known; inputting the personal basic information of the multiple users into a classification model to be trained to obtain feature information of the multiple users and predicted categories of users with known categories; and training the classification model to be trained according to the behavior information of the multiple users, the feature information of the multiple users, the predicted categories of the users with the known categories, and real categories of the users with the known categories, to obtain a trained classification model. The user categories determined by using the classification model are more accurate.

20 Claims, 5 Drawing Sheets (58) Field of Classification Search
CPC ...... G06N 3/098; G06N 3/0985; G06N 3/045; G06N 3/0455
See application file for complete search history.

(56) References Cited

U.S. PATENT DOCUMENTS

2021/0012198 A1* 1/2021 Zhang ................ G06N 3/08
2021/0374499 A1* 12/2021 Wu .................... G06F 17/16

FOREIGN PATENT DOCUMENTS

| CN | 108960142 A | | 12/2018 | |
|----|-------------|---|---------|---|
| CN | 109934619 A | | 6/2019 | |
| CN | 110189236 A | | 8/2019 | |
| CN | 110490027 A | | 11/2019 | |
| CN | 111461938 A | | 7/2020 | |
| CN | 111639696 A | * | 9/2020 | ........... G06K 9/6256 |
| CN | 111695680 A | | 9/2020 | |
| CN | 111709575 A | | 9/2020 | |
| CN | 114494753 A | * | 5/2022 | |
| WO | 2019/120019 A1 | | 6/2019 | |

OTHER PUBLICATIONS

Notification of Grant of Patent Rights for Invention Application of corresponding Chinese Application No. 202011595164.5, dated Dec. 16, 2023, 8 pages.

Lot Fonteyne et al., "Program-specific prediction of academic achievement on the basis of cognitive and non-cognitive factors", Learning and Individual Differences 56, dated May 31, 2017, pp. 34-48.

Zhu Guang et al., "Research on Classification of Personalized Digital Information Service Requirements for Library Users Based on SOM", dated Feb. 5, 2013, 4 pages.

Liu Hui, "Learning-oriented homework analysis", Primary and Secondary School Management, Jan. 24, 2019, 5 pages.

* cited by examiner

METHOD FOR TRAINING CLASSIFICATION MODEL, CLASSIFICATION METHOD, APPARATUS AND DEVICE

CROSS-REFERENCE TO RELATED APPLICATION

This application claims priority to Chinese Patent Application No. 2020115951645, filed on Dec. 28, 2020, the disclosure of which is hereby incorporated by reference in its entirety.

TECHNICAL FIELD

The present application relates to deep learning and artificial intelligence technologies in the field of data processing, and in particular to a method for training a classification model, a classification method, an apparatus and a device.

BACKGROUND

In a variety of application scenarios, users need to be classified. For example, in a teaching scenario, a teacher needs to identify grade categories of students, so as to give targeted guidance to the students according to the grade categories. For another example, in an information recommendation scenario, it is necessary to identify interest categories of users, so as to perform personalized information recommendation to the users according to the interest categories.

In the prior art, it is generally that identification rules corresponding to different user categories are set in advance. An identification rule corresponding to a category defines characteristics of users belonging to this category. When classification is performed on a user, characteristics of this user are first extracted, and then the extracted characteristics are matched with the identification rule, thereby determining the category to which the user belongs.

However, the above-mentioned identification rules are generally generated by relevant personnel analyzing various types of users, which may result in low accuracy of the identification rules due to the influence of experiences or subjective factors of a staff, and then the accuracy of classification results is low by using these identification rules to classify the users.

SUMMARY

The present application provides a method for training a classification model, a classification method, an apparatus and a device.

According to a first aspect of the present application, a method for training a classification model is provided, including:

acquiring behavior information of multiple users and personal basic information of the multiple users; where categories of at least part of users of the multiple users are known;

inputting the personal basic information of the multiple users into a classification model to be trained to obtain feature information of the multiple users and predicted categories of users with known categories; and training the classification model to be trained according to the behavior information of the multiple users, the feature information of the multiple users, the predicted categories of the users with the known categories, and real categories of the users with the known categories, to obtain a trained classification model.

According to a second aspect of the present application, a classification method is provided, including:

acquiring feature information of users with unknown categories;

inputting the feature information of the users with the unknown categories into a trained classification model, and determining predicted categories of the users with the unknown categories according to an output of the classification model;

where, the trained classification model is obtained by training according to behavior information of multiple users, personal basic information of the multiple users, and real categories of users with known categories; the multiple users include the users with the known categories and the users with the unknown categories, and the feature information of the users with the unknown categories is obtained by learning in a process of training the classification model, the classification model is obtained by training by using the method according to any one of the first aspect.

According to a third aspect of the present application, an apparatus for training a classification model is provided, including:

an acquiring module, configured to acquire behavior information of multiple users and personal basic information of the multiple users; where categories of at least part of users of the multiple users are known;

a training module, configured to input the personal basic information of the multiple users into a classification model to be trained to obtain feature information of the multiple users and predicted categories of users with known categories; and the training module is further configured to train the classification model to be trained according to the behavior information of the multiple users, the feature information of the multiple users, the predicted categories of the users with the known categories, and real categories of the users with the known categories, to obtain a trained classification model.

According to a fourth aspect of the present application, a classification apparatus is provided, including:

an acquiring module, configured to acquire feature information of users with unknown categories;

a classifying module, configured to input the feature information of the users with the unknown categories into a trained classification model, and determine predicted categories of the users with the unknown categories according to an output of the classification model;

where, the trained classification model is obtained by training according to behavior information of multiple users, personal basic information of the multiple users, and real categories of users with known categories; the multiple users include users with the known categories and the users with the unknown categories, where the feature information of the users with the unknown categories is obtained by learning in a process of training the classification model, and the classification model is obtained by training by using the method according to the first aspect.

According to a fifth aspect of the present application, an electronic device is provided, including:
  at least one processor; and
    a memory communicatively connected with the at least one processor; where,
    the memory stores instructions executable by the at least one processor, and the instructions are executed by the at least one processor, to enable the at least one processor to execute the method according to any one of the first aspect, or, execute the method according to the second aspect.

According to a sixth aspect of the present application, a non-transitory computer-readable storage medium storing computer instructions is provided, where the computer instructions are used to cause a computer to execute the method according to any one of the first aspect, or, execute the method according to the second aspect.

According to a seventh aspect of the present application, a computer program product including a computer program is provided, the computer program, when executed by a processor, implements the method according to any one of the first aspect, or, implements the method according to the second aspect.

It should be understood that the content described in this section is not intended to identify key or important features of embodiments of the present application, nor is it intended to limit the scope of the present application. Other features of the present application will be easily understood by the following description.

BRIEF DESCRIPTION OF DRAWINGS

The attached drawings are used for a better understanding of the present solutions and do not constitute a limitation of the present application. Among them.

DESCRIPTION OF EMBODIMENTS

Exemplary embodiments of the present application will be illustrated in combination with the accompanying drawings in the following, which include various details of the embodiments of the present application to facilitate understanding, and they should be considered as merely exemplary. Therefore, those of ordinary skill in the art should recognize that various changes and modifications can be made to the embodiments described herein without departing from the scope and spirit of the present application. Also, for clarity and conciseness, description of well-known functions and structures are omitted in the following description.

The present application provides a method for training a classification model, a classification method, an apparatus, and a device, which are applied to deep learning and artificial intelligence technologies in the field of data processing to improve the accuracy of classification results.

The present application utilizes a machine learning method to learn a relationship between influence factors of categories of users and the categories to obtain a classification model. Furthermore, the classification model is utilized to classify the users to improve the accuracy of determined categories of the users.

In the course of research, the inventor found that behaviors of the users would affect categories to which the users belong. Moreover, if multiple users have similarities, categories to which the multiple users belong are also the same or similar, and the similarities among the users may be reflected through personal basic information of the users. Therefore, in the present application, behavior information of the users and the personal basic information of the users are used as influence factors of the categories. That is to say, the classification model is obtained by learning relationships among the behavior information of the users, the personal basic information of the users and the categories so that the classification model can accurately classify the users.

Schemes of the present application may be applied in multiple application scenarios, including but not limited to: a scenario for classifying student grades, a scenario for classifying employee performance, a scenario for classifying user interests, and the like. In order to facilitate the understanding, when the embodiments of the present application involve examples, the scenario for classifying student grades is taken as example for description, and implementations of other application scenarios are similar, and the embodiments of the present application will not be repeated.

Technical solutions of the present application will be described in detail below in conjunction with several specific embodiments. The following specific embodiments may be combined with each other, and the same or similar concepts or processes may not be repeated in some embodiments.

Figure 1:
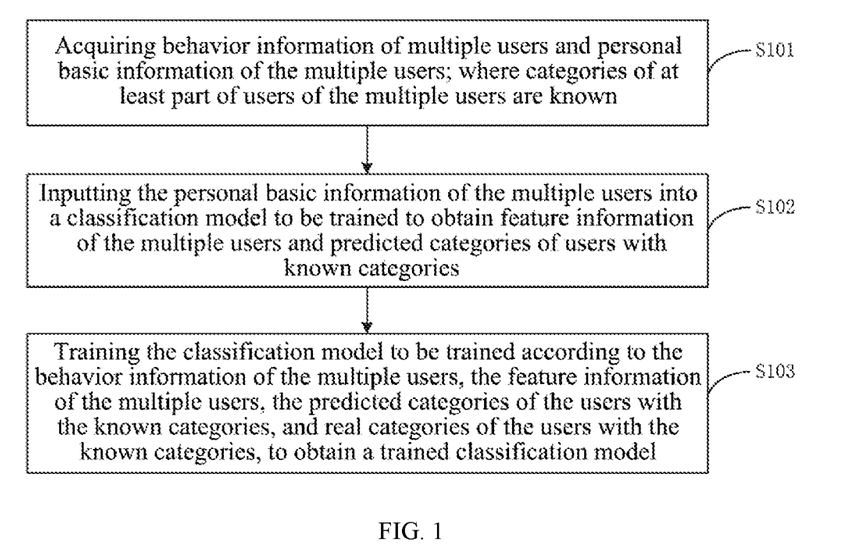
FIG. 1 is a schematic flowchart of a method for training a classification model provided by the present application.

FIG. 1 is a schematic flowchart of a method for training a classification model provided by the present application. As shown in FIG. 1, the method of the present embodiment includes:

S101: acquiring behavior information of multiple users and personal basic information of the multiple users; where categories of at least part of users of the multiple users are known.

The method of the present embodiment may be executed by an electronic device. The electronic device may be any electronic device with computing capabilities, including but not limited to: terminal devices, server, and the like. Among them, the server may be a cloud server. The electronic device in the present embodiment is integrated with a database, or the electronic device is connected to the database. The database is used to store data required for training the classification model. The electronic device can acquire the data required for training the classification model from the database.

In the present embodiment, the behavior information refers to information used to describe behavior characteristics of the users. The behavior information may include explicit behaviors and implicit behaviors of the users. The implicit behaviors include, but are not limited to, psychological activities or motivations of the users. The explicit behaviors include, but are not limited to, manners, actions and the like shown by the users.

When the classification model is applied to different application scenarios, the behavior information of the users may include different contents. Exemplarily, in the scenario for classifying students grades, the behavior information may also be called learning status information, which refers to information used to describe learning motivations and behaviors of students, for example learning habits, learning attitudes, learning methods, and emotional moods during learning, and the like. In the scenario for classifying employee performance, the behavior information may also be referred to as working status information, which refers to information used to describe working motivations and behaviors of employees, for example working habits, working attitudes, working methods, working pressures, and the like. In the scenario for classifying user interests, the behavior information includes, but is not limited to, purchase behaviors, browsing behaviors, comment behaviors of the users, and so on.

The personal basic information of the users refers to information used to describe portraits of the users. In some examples, the personal basic information of the users may also be referred to as user portrait information. The personal basic information of the users includes but is not limited to: information such as gender, age, family background, hometown, major, occupation, education degree, years of working and the like. Similar to the behavior information, when the classification model is applied to different application scenarios, the personal basic information of the users may include different contents.

In the embodiment of the present application, the behavior information of the users and the personal basic information of the users may be collected in a variety of ways, for example, may be obtained through big data analysis. In some possible scenarios, a form of questionnaires may also be used, in which the users are asked to provide their own behavior information and personal basic information by themselves. In other words, the behavior information of the multiple users and the personal basic information of the multiple users may be obtained according to questionnaire information filled out by the multiple users. An example will be given below with reference to FIG. 2.

Figure 2:
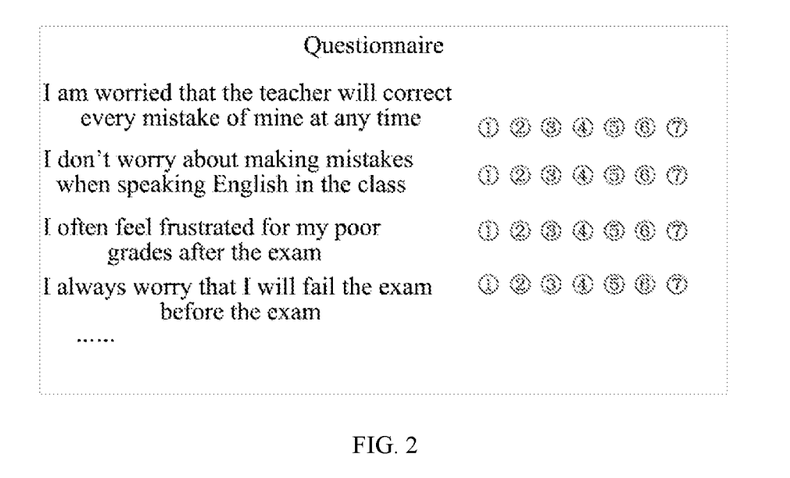
FIG. 2 is a schematic diagram of a questionnaire provided by the present application.

Exemplarily, FIG. 2 is a schematic diagram of a questionnaire provided by the present application. An educational questionnaire is taken as an example in FIG. 2. As shown in FIG. 2, the questionnaire usually contains a series of questions or descriptive sentences (for example: I am worried that the teacher will correct my mistakes at any time), and each of questions or descriptive sentences provides a preset number of options for the users to choose. For example, FIG. 2 illustrates a situation where the descriptive sentences are included in the educational questionnaire. Options 1-7 are provided for each of description sentences, where 1 means strongly disagreement and 7 means strongly agreement. That is, the degree of agreement is increased in the order of 1 to 7. When filling out the educational questionnaire, the users may choose appropriate options according to their degrees of agreement with the descriptive sentences.

It should be understood that the questionnaire information includes: choice answers to the questions or the descriptive sentences of the users, and these choice answers implicitly indicate behavior characteristics of the users. Therefore, the "choice answers to the questions or the descriptive sentences of the users" in the questionnaire information may be used as the behavior information of the users. Of course, the behavior information of the users may also be obtained by analyzing and processing "choice answers to the questions or the descriptive sentences of the users".

In addition, when collecting educational questionnaire information, the users are usually required to provide the personal basic information such as gender, age, family background, hometown, major, and the like. Therefore, the personal basic information of the users may also be obtained according to the education questionnaire information.

In the present embodiment, the categories of at least part of users of the multiple users are known, that is, real categories to which the at least part of users belong are known. It can be understood that these known real categories will be used as training labels. In some examples, categories of all users of the multiple users are known, which is equivalent to that all samples have labels, and this situation corresponds to a fully-supervised training scenario. In other examples, categories of part of users of the multiple users are known, which is equivalent to that part of samples have labels, and this situation corresponds to a semi-supervised training scenario.

S102: the personal basic information of the multiple users is inputted into a classification model to be trained to obtain feature information of the multiple users and predicted categories of users with known categories.

In the present embodiment, the classification model is configured to receive the personal basic information of the multiple users, and perform feature extraction on the personal basic information of the multiple users to obtain the feature information of the multiple users, and classify feature information of the users with the known categories to obtain the predicted categories of the users with the known categories.

The classification model may use a neural network model. It should be noted that the present embodiment does not limit the structure of the classification model, and multiple network structures may be used. Several possible network structure examples may refer to the detailed description of the subsequent embodiments.

S103: the classification model to be trained is trained according to the behavior information of the multiple users, the feature information of the multiple users, the predicted categories of the users with the known categories, and real categories of the users with the known categories to obtain a trained classification model.

Specifically, a loss of the classification model to be trained may be determined according to the behavior information of the multiple users, the feature information of the multiple users, the predicted categories of the users with the known categories, and the real categories of the users with the known categories.

In order to achieve an end-to-end training, the above loss may be an end-to-end loss of the classification model. In a possible implementation, the above loss may include a first loss and a second loss. The first loss represents a feature loss, and the second loss represents a classification loss. Exemplarily, the first loss may be determined according to the behavior information of the multiple users and the feature information of the multiple users. In addition, the second loss is determined according to the predicted categories of the users with the known categories and the real categories of the users with the known categories. Then, the loss of the classification model to be trained is determined according to the first loss and the second loss.

Further, the classification model to be trained is trained with a goal of minimizing the loss, to obtain the trained classification model.

Exemplarily, with the goal of minimizing the loss, parameters in the classification model are optimized and adjusted. The training is finished through multiple iterations until the classification accuracy of the classification model is greater than or equal to a preset value, or until a preset number of iterations is reached.

The method for training the classification model provided by the present embodiment includes: acquiring behavior information of multiple users and personal basic information of the multiple users; where categories of at least part of users of the multiple users are known; inputting the personal basic information of the multiple users into a classification model to be trained to obtain feature information of the multiple users and predicted categories of users with known categories; and training the classification model to be trained according to the behavior information of the multiple users, the feature information of the multiple users, the predicted categories of the users with the known categories, and real categories of the users with the known categories, to obtain a trained classification model. Since the behavior information of the users and the personal basic information of the users are considered in the process of training the classification model, the categories of the users determined by using the classification model are more accurate.

On the basis of the foregoing embodiments, in order to facilitate understanding, the following embodiments are described using the scenario for classifying student grades as examples. In the following embodiments, the classification model is specifically a grade classification model, which is used to classify grades of students; the behavior information of the users is specifically that learning status information of the students; the categories of the users are specifically that grade categories of the students.

Figure 3:
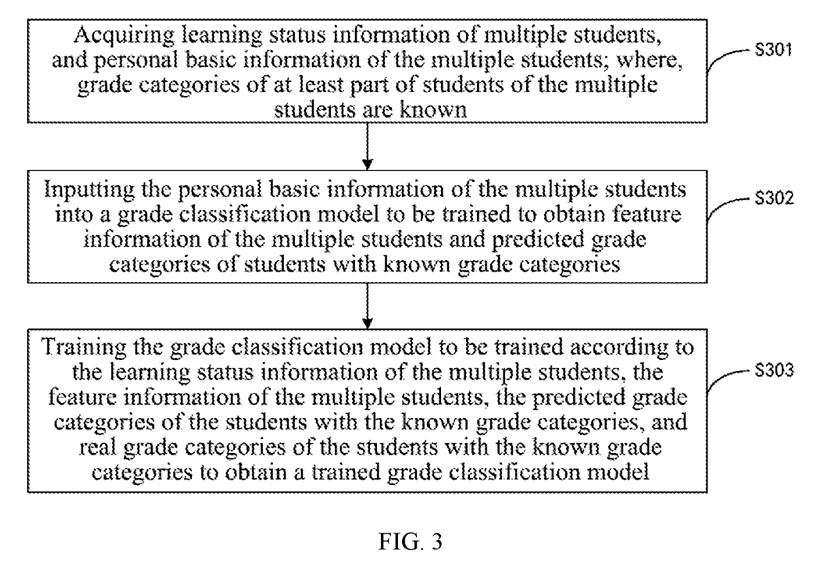
FIG. 3 is a schematic flowchart of another method for training a classification model provided by the present application.

FIG. 3 is a schematic flowchart of another method for training a classification model provided by the present application. As shown in FIG. 3, the method of the present embodiment includes:

S301: acquiring learning status information of multiple students and personal basic information of the multiple students; where, grade categories of at least part of students of the multiple students are known.

In the present embodiment, the learning status information of the students refers to information used to describe learning motivations and behaviors of the students. The learning status information includes but is not limited to: information such as learning habits, learning attitudes, learning methods, learning durations, classroom satisfactions, learning pressures, emotional moods during learning, and the like.

The personal basic information of the students refers to information used to describe portraits of the students. The personal basic information of the students includes but is not limited to: information such as gender, age, family background, hometown, major, enrollment time, school level, grade, self-assessment, and the like. In some examples, the personal basic information of the students may also be referred to as student portrait information.

In the present embodiment, the multiple students are taken as training samples. The learning status information of the multiple students and the personal basic information of the multiple students may be acquired according to educational questionnaire information filled out by the multiple students.

It should be understood that the educational questionnaire information includes: choice answers to questions or descriptive sentences of the students, and these choice answers implicitly indicate motivations and behaviors of the students. Therefore, the "choice answers to questions or descriptive sentences of the students" in the education questionnaire information may be used as the learning status information of the students. Of course, the learning status information of the students may also be obtained by analyzing and processing the "choice answers to questions or descriptive sentences of the students".

When collecting the educational questionnaire information, the students are usually asked to provide the personal basic information such as gender, age, family background, hometown, major, enrollment time, school level, grade, and the like. Therefore, the personal basic information of the students may be obtained according to the educational questionnaire information.

In the present embodiment, the student grades may be divided into multiple categories. For example: it may be divided into four categories: excellent, good, qualified, and unqualified. It may also be divided into two categories: pass and fail. Of course, there may also be other division methods, which are not limited by the present application.

The grade categories of at least part of students of the multiple students are known, and the known grade categories are real grade categories of corresponding students. Exemplarily, the students may be asked to provide their own grade categories in an education questionnaire, so that the grade categories of the students may be obtained according to the education questionnaire information. Exemplarily, the grade categories of the students may also be obtained through educational institutions where the students are located, for example, grade categories determined according to historical grades of the students. In this way, the obtained categories are more objective.

It can be understood that these known grade categories will be used as training labels. In some examples, grade categories of all students of the multiple students are known, which is equivalent to that all samples have labels, and this situation corresponds to a fully-supervised training scenario. In other examples, grade categories of part of students of the multiple students are known, which is equivalent to that part of samples have labels, and this situation corresponds to a semi-supervised training scenario.

S302: inputting the personal basic information of the multiple students into a grade classification model to be trained to obtain feature information of the multiple students and predicted grade categories of students with known grade categories.

In the present embodiment, the grade classification model is configured to receive the personal basic information of the multiple students, and perform feature extraction on the personal basic information of the multiple students to obtain the feature information of the multiple students, and, classify feature information of the students with the known grade categories to obtain the predicted grade categories of the students with the known grade categories.

The grade classification model may use a neural network model. It should be noted that this embodiment does not limit the structure of the grade classification model, and multiple network structures may be used. Several possible network structure examples may refer to the detailed description of the subsequent embodiments.

S303: training the grade classification model to be trained according to the learning status information of the multiple students, the feature information of the multiple students, the predicted grade categories of the students with the known grade categories, and real grade categories of the students with the known grade categories to obtain a trained grade classification model.

In the present embodiment, the predicted grade categories of the students are obtained by classifying the feature information of the students. Since the learning status information indicates the motivations and the behaviors of the students, only when the feature information of the students is infinitely close to the learning status information, the predicted grade categories obtained by classifying the feature information of the students may be closer to the real grade categories. Therefore, in the process of training the training model, it is needed to train the grade classification model to be trained according to the learning status information of the multiple students, the feature information of the multiple students, the predicted grade categories of the students with the known grade categories, and the real grade categories of the students with the known grade categories.

Specifically, a loss of the grade classification model to be trained may be determined according to the learning status information of the multiple students, the feature information of the multiple students, the predicted grade categories of the students with the known grade categories, and the real grade categories of the students with the known grade categories.

In a possible implementation, the above loss may include a first loss and a second loss. The first loss represents a feature loss, and the second loss represents a classification loss. Exemplarily, the first loss may be determined according to the learning status information of the multiple students and the feature information of the multiple students. In addition, the second loss is determined according to the predicted grade categories of the students with the known grade categories and the real grade categories of the students with the known grade categories. Then, the loss of the grade classification model to be trained is determined according to the first loss and the second loss.

Further, the grade classification model to be trained is trained with a goal of minimizing the loss, to obtain the trained grade classification model.

Exemplarily, with the goal of minimizing the loss, parameters in the grade classification model are optimized and adjusted. The training is finished through multiple iterations until the classification accuracy of the grade classification model is greater than or equal to a preset value, or until a preset number of iterations is reached.

The method for training the grade classification model provided by the present embodiment includes: acquiring learning status information of multiple students, and personal basic information of the multiple students; where, grade categories of at least part of students of the multiple students are known; inputting the personal basic information of the multiple students into a grade classification model to be trained to obtain feature information of the multiple students and predicted grade categories of students with known grade categories; training the grade classification model to be trained according to the learning status information of the multiple students, the feature information of the multiple students, the predicted grade categories of the students with the known grade categories, and the real grade categories of the students with the known grade categories to obtain a trained grade classification model. Since in the process of training the grade classification model, the learning status information and the personal basic information of the students are considered, therefore, the grade categories determined by the grade classification model are more accurate.

The above embodiments describe the process of training the classification model. The following describes possible network structures of the classification model in combination with a few specific examples.

Figure 4A:
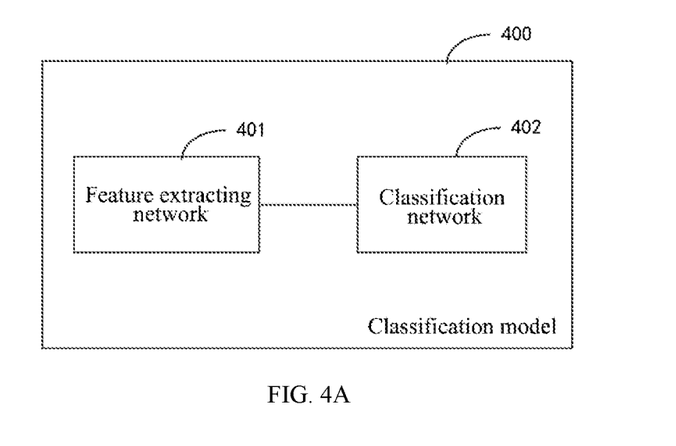
FIG. 4A is a schematic structural diagram of a possible classification model provided by the present application.

FIG. 4A is a schematic structural diagram of a possible classification model provided by the present application. As shown in FIG. 4A, a classification model 400 of the present embodiment includes: a feature extracting network 401 and a classification network 402.

The feature extracting network 401 is configured to receive the personal basic information of the multiple users, perform feature extraction on the personal basic information of the multiple users, and output the feature information of the multiple users.

In an example, when the categories of all users of the multiple users are known, the feature extracting network 401 may output the feature information of the multiple users to the classification network 402.

In another example, when the multiple users include both users with known categories and users with unknown categories, feature information of the users with the known categories may be used to train the classification network 402. Therefore, the feature extracting network 401 may output the feature information of the users with the known categories of the multiple users to the classification network 402.

The classification network 402 is configured to receive the feature information of the users with the known categories, classify the feature information of the users with the known categories, and output the predicted categories of the users with the known categories.

Figure 4B:
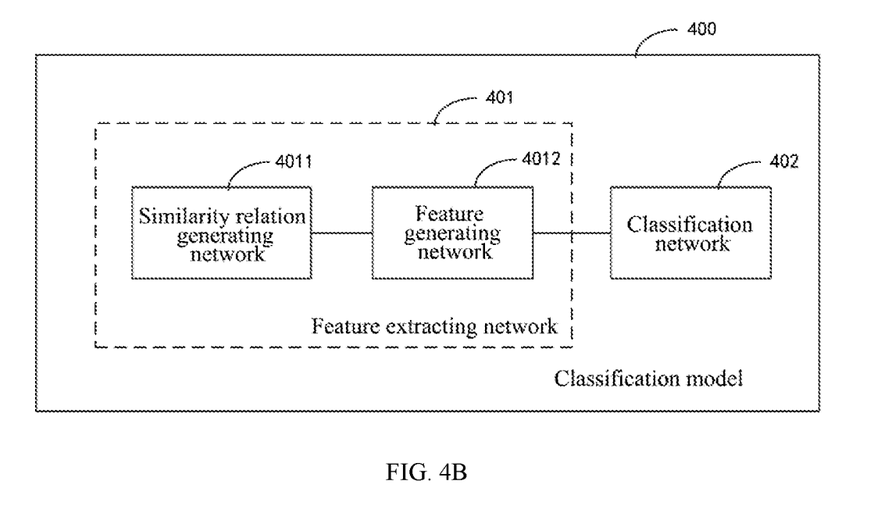
FIG. 4B is a schematic structural diagram of another possible classification model provided by the present application.

FIG. 4B is a schematic structural diagram of another possible classification model provided by the present application. As shown in FIG. 4B, on the basis of that shown in FIG. 4A, the feature extracting network 401 may include: a similarity relation generating network 4011 and a feature generating network 4012.

The similarity relation generating network 4011 is configured to receive the personal basic information of the multiple users, generate similarity relations among the multiple users according to the personal basic information of the multiple users, and output the similarity relations among the multiple users.

Exemplarily, the similarity relation generating network 4011 outputs the similarity relations among the multiple users to the feature generating network 4012.

The feature generating network 4012 is configured to receive the similarity relations among the multiple users, update the feature information of the multiple users according to the similarity relations among the multiple users, and output updated feature information of the multiple users.

Exemplarily, the feature information of the multiple users initially input in the feature generating network 4012 may be randomly generated. The similarity relations among the multiple users output by using the similarity relation generating network 4011 are used to continuously update the feature information of the multiple users to obtain the updated feature information of the multiple users.

In a possible implementation, the similarity relation generating network 4011 may include: multiple first neural networks and multiple second neural networks. The first neural networks and the second neural networks are set at intervals.

The first neural networks are configured to receive the personal basic information of the multiple users, generate the similarity relations among the multiple users according to the personal basic information of the multiple users, and output the similarity relations among the multiple users to the second neural networks connected thereto, or to the feature generating network; and the second neural networks are configured to receive the similarity relations among the multiple users and the personal basic information of the multiple users, update the personal basic information of the multiple users according to the similarity relations among the multiple users, and output the updated personal basic information of the multiple users to the first neural networks connected thereto.

By setting the multiple first neural networks and the multiple second neural networks at intervals in the similarity relation generating network, the obtained similarity relations among the multiple users are more accurate.

In the network structures of the classification model described in any of the foregoing embodiments, neural network models adopted by different network units may be the same or different.

In an embodiment, the first neural networks may adopt Multilayer Perceptrons (MLP), and the second neural networks may adopt Graph Convolutional Networks (GCNs).

In an embodiment, the feature generating network may adopt a GCN. Where, the structure of the GCN corresponding to the feature generating network and the structure of the GCN corresponding to the above-mentioned second neural networks may be the same or different.

In an embodiment, the classification network may adopt an MLP. Where, the structure of the MLP corresponding to the classification network and the structure of the MLP corresponding to the above-mentioned first neural networks may be the same or different.

The MLP may also be referred to as an artificial neural network (ANN). The MLP is a feedforward artificial neural network, which maps multiple input data sets to a single output data set. One or more hidden layers may be included between an input layer and an output layer of the MLP. Layer and layer of the MLP are fully connected therebetween, that is, any neuron in an upper layer is connected to all neurons in a next layer.

The GCN is a neural network model with graphs as input. Nodes in the graphs represent individuals in the network, and edges represent connections among the individuals.

On the basis of any of the foregoing embodiments, the specific training process will be described below in combination with the classification model shown in FIG. 4C.

Figure 4C:
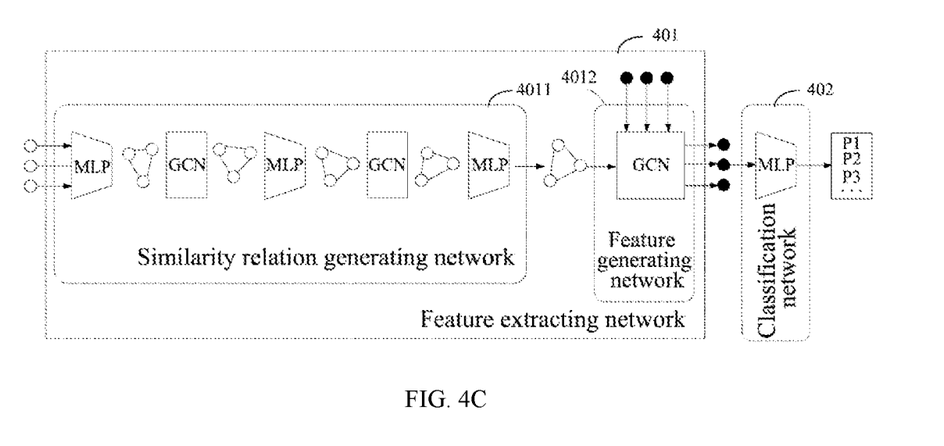
FIG. 4C is a schematic structural diagram of yet another possible classification model provided by the present application.

FIG. 4C is a schematic structural diagram of yet another possible classification model provided by the present application. As shown in FIG. 4C, in the classification model, the first neural networks in the similarity generating network 4011 adopt MLPs, the second neural networks adopt GCNs, the feature generating network 4012 adopts a GCN, and the classification network 402 adopts an MLP.

Based on the classification model shown in FIG. 4C, the scenario for classifying student grades are taken as examples in the following to describe the process of training the classification model in detail. The process of training the classification model includes the following steps (1) to (4).

(1) The personal basic information of the multiple students is learned by using the similarity relation generating network to obtain the similarity relations among the multiple students.

Specifically, it is assumed that the number of the multiple students is m, and a dimension of personal basic information of each of students is n. For an $i^{th}$ student among the multiple students, personal basic information thereof is recorded as $b_i \in R^n$. A matrix composed of the personal basic information of the m students is recorded as B, that is, $B=[b_1^T, b_2^T, \ldots, b_m^T] \in R^{m \times n}$. Where, $(\cdot)^T$ is a transposition operation.

A similarity relation between any two students among the m students is estimated by using the MLP in the similarity relation generating network, to obtain a similarity relation matrix A. The similarity relation matrix A determines a graph with the students as nodes and the similarity relations among the students as edges. As shown in Formula 1.

$$A_{ij} = \text{sim}(b_i, b_j) = \text{MLP}(\text{abs}(b_i - b_j)) \quad \text{Formula 1,}$$

where, the MLP represents a multilayer perceptron, which can capture complex nonlinear functions, and abs represents taking an absolute value. $A_{ij}$ is a similarity relation between the $i^{th}$ student and a $j^{th}$ student.

It can be understood that since the personal basic information of the students includes multiple dimensions of information, different dimensions represent different meanings. By using the MLP to evaluate the similarity relations, the accuracy of the similarity relations is ensured.

As shown in FIG. 4C, after the similarity relation A is estimated using the MLP, the personal basic information B is updated using the GCN according to similarity relation A. As shown in Formula 2.

$$B = \sigma(ABW_1) \quad \text{Formula 2,}$$

where, $W_1$ is a parameter matrix of the GCN in the similarity relation generating network, and $\sigma$ is an activation function.

Referring to FIG. 4C, the similarity relation generating network may include multiple MLPs and multiple GCNs. The MLPs and the GCNs are set at intervals. In this way, the above Formula 1 and Formula 2 may be iteratively executed multiple times. The similarity relation generating network performs multiple iterative updates on the similarity relation A, and finally outputs the similarity relation A to the feature generating network. In FIG. 4C, two iterations is taken as an example for illustration. It can be understood that after multiple iterations, the similarity relation A is more accurate.

(2) The similarity relations among the multiple students are learned by using the feature generating network to obtain feature information of the multiple students.

Specifically, it is assumed that a dimension of feature information of each of students is k. For an $i^{th}$ student among the multiple students, feature information thereof is randomly initialized as $u_i \in R^k$. A matrix composed of the feature information of the m students is recorded as U, that is, $U=[u_1^T, u_2^T, \ldots, u_m^T] \in R^{m \times k}$.

Feature information U is updated according to the similarity relation A learned in the above step (1) by using the GCN in the feature generating network. As shown in Formula 3.

$$U = \sigma(AUW_2) \quad \text{Formula 3,}$$

where, $W_2$ is a parameter matrix of the GCN in the feature generating network, and $\sigma$ is an activation function.

In an embodiment, the GCN in the feature generating network may include multiple layers. In this way, it is equivalent to executing the above Formula 3 for multiple times. Through multiple iterations of Formula 3, the accuracy of the feature information U is improved.

(3) The feature information of the students with the known grade categories is classified by using the classification network to obtain the predicted grade categories of the students with the known grade categories.

Specifically, the students with the known grade categories among the m students form a set D. For a student i∈D, feature information $u_i$ of the student i is input into the MLP corresponding to the classification network, and the MLP predicts and obtains a probability $p_i^c$ that the grade of the student i belongs to category c. It is assumed that the grades are divided into C categories, then c∈{1, 2, . . . , C}.

(4) An end-to-end loss of the grade classification model is calculated, and the grade classification model is trained with a goal of minimizing the end-to-end loss.

In the training process, the feature information of the m students may be updated by using learning status information of the m students, so as to continuously improve the accuracy of the feature information of the m students.

Exemplarily, the learning status information of the m students is recorded as O. In an example, it is assumed that the educational questionnaire includes q questions/descriptive sentences, the learning status information O may be a matrix composed of answers of the m students to the q questions/descriptive sentences, $O \in R^{m \times q}$.

Feature information of each of questions/descriptive sentences in the educational questionnaire is record as V, and then information X that the students fill out the questionnaire may be obtained by predicting according to the feature information U of the students and the feature information V of each of questions/descriptive sentences in the educational questionnaire. As shown in Formula 4.

$$X = UVT \qquad \text{Formula 4,}$$

it can be understood that when the feature information U of the students is infinitely accurate, the predicted information X that the students fill out the questionnaire should be infinitely close to actual information that the students fill out the questionnaire (i.e., the learning status information O). Therefore, in the training process, X that is infinitely close to O may be taken as a training target, so that the feature information U is continuously updated according to the learning status information O, so as to improve the accuracy of the feature information U.

Exemplarily, Formula 5 may be used as a first loss.

$$l_1 = \|O - UV^T\|_F^2 \qquad \text{Formula 5,}$$

where, $l_1$ is the first loss, and $\|\cdot\|_F$ represents a norm.

In addition, in the training process, the predicted grade categories that is infinitely close to the real grade categories may also be taken as another training target.

Exemplarily, cross entropy may be used as a second loss, as shown in Formula 6.

$$l_2 = -\Sigma_{i \in D} \log(p_i^{y_i}) \qquad \text{Formula 6,}$$

where, $l_2$ is the second loss, D represents a set composed of the students with the known grade categories, $y_i$ represents a real grade category of a student i, and $p_i^{y_i}$ represents a probability that the student i output by the MLP corresponding to the classification network belongs to category $y_i$.

In this way, the end-to-end loss L of the grade classification model may be obtained according to the first loss $l_1$ and the second loss $l_2$, and then the parameters of the grade classification model are adjusted and optimized by taking minimizing the end-to-end loss L as an objective function (as shown in Formula 7), the training is finished until the classification accuracy of the grade classification model is greater than or equal to a preset threshold, or until the number of iterations reaches a preset number.

$$\min_\theta L = \min_\theta [\|O - UV^T\|_F^2 - \Sigma_{i \in D} \log(p_i^{y_i})] \qquad \text{Formula 7,}$$

where, θ includes all learnable parameters in the grade classification model, for example $W_1$, $W_2$ and parameters of the MLP. In an embodiment, a random optimization algorithm for example an adaptive moment estimation (ADAM) algorithm may be used to optimize the grade classification model.

In the present embodiment, the training efficiency is improved by performing end-to-end training on the grade classification model.

In the present embodiment, the m students include the students with the known grade categories and the students with the unknown grade categories. In the process of training the grade classification model, the feature information of all students (that is, including the students with the known grade categories and the students with the unknown grade categories) is unified learned, that is, the similarity relations among all students are obtained by learning according to the personal basic information of all students, and then the feature information of all students may be obtained by learning according to the similarity relations among all students. Through the unified learning of the feature information of all students, the accuracy of the feature information is improved.

Further, since the feature information learned in step (2) also includes the feature information of the students with the unknown grade categories, in this way, after the training of the grade classification model is finished, the feature information of the students with the unknown grade categories is directly input into the classification network of the grade classification model, and the grade categories of these students with the unknown grade categories may be obtained by predicting, which improves the efficiency of grade prediction.

Exemplarily, it is assumed that the students with the unknown grade categories among the m students form a set T, then for a student j∈T, feature information uj of the student j learned in step (2) is input into the MLP corresponding to the classification network, and the MLP outputs a probability that the student j belongs to multiple categories. A category corresponding to a maximum probability is determined as a grade category of this student.

On the basis of any of the foregoing embodiments, an embodiment of the present application also provides a classification method, and the classification model obtained by training in the foregoing embodiments may be used to determine the categories of the users. Description is performed in the following in combination with FIG. 5.

Figure 5:
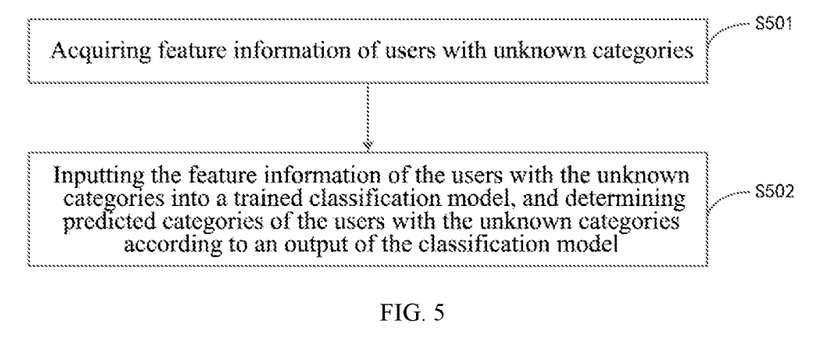
FIG. 5 is a schematic flowchart of a classification method provided by the present application.

FIG. 5 is a schematic flowchart of a classification method provided by the present application. An executive entity of the present embodiment may be an electronic device, and the electronic device may be the same as or different from an executive entity shown in FIG. 1. As shown in FIG. 5, the method of the present embodiment includes:

S501: acquiring feature information of users with unknown categories.

S502: inputting the feature information of the users with the unknown categories into a trained classification model, and determining predicted categories of the users with the unknown categories according to an output of the classification model.

The trained classification model is obtained by training according to behavior information of multiple users, personal basic information of the multiple users, and real categories of users with known categories. The multiple users include users with the known categories and the users with the unknown categories, and the feature information of the users with the unknown categories is obtained by learned in a process of training the classification model.

The classification model of the present embodiment is obtained by training by using the method for training in the foregoing embodiments.

The classification method of the present embodiment may be used to classify student grades. Illustration is performed in combination with FIG. 4C, the feature information of the students with the unknown grade categories is input into the MLP corresponding to the classification network, and the MLP outputs probabilities that the students belong to the multiple categories. The category corresponding to the maximum probability is determined as the grade category of this student. The grade categories of the students are determined by using the classification model obtained by training in the foregoing embodiments, the accuracy of the determined grade categories is ensured.

The grade classification method of the present embodiment may be applied to a scenario for assisting a teacher to supervise learning of students. Exemplarily, the teacher may issue educational questionnaires to multiple students. The multiple students include students with known grade categories and students with unknown grade categories. According to the educational questionnaires filled out by the multiple students, the grade classification model is obtained by training through the method for training the classification model provided in the present application. Then the students with the unknown grade categories are predicted/classified by using the grade classification model to obtain their grade categories. In this way, even if time nodes of a mid-term and a final exam have not yet arrived, the teacher may already accurately determine the grade categories of the students. Furthermore, for students with poor grades, the teacher can intervene as soon as possible to correct bad learning habits and psychology, thereby improving their learning grades.

Figure 6A:
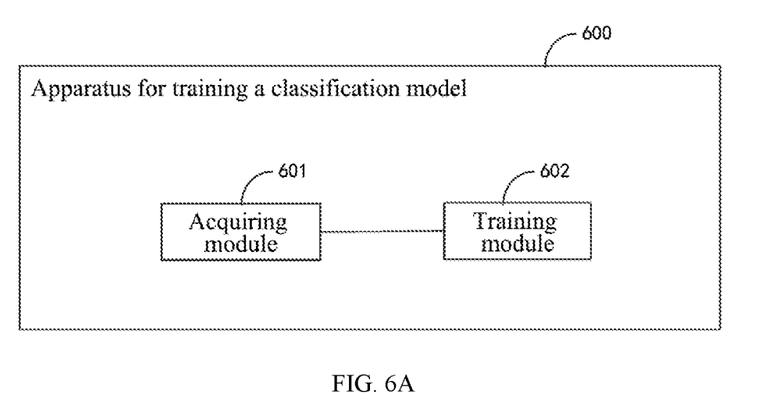
FIG. 6A is a schematic structural diagram of an apparatus for training a classification model provided by the present application.

FIG. 6A is a schematic structural diagram of an apparatus for training a classification model provided by the present application. The apparatus in the present embodiment may be in a form of software and/or hardware. As shown in FIG. 6A, the apparatus 600 for training the classification model provided in the present embodiment includes: an acquiring module 601 and a training module 602.

The acquiring module 601 is configured to acquire behavior information of multiple users and personal basic information of the multiple users; where categories of at least part of users of the multiple users are known;

the training module 602 is configured to input the personal basic information of the multiple users into a classification model to be trained to obtain feature information of the multiple users and predicted categories of users with known categories; and the training module 602 is further configured to train the classification model to be trained according to the behavior information of the multiple users, the feature information of the multiple users, the predicted categories of the users with the known categories, and real categories of the users with the known categories, to obtain a trained classification model.

In a possible implementation, the classification model to be trained includes: a feature extracting network and a classification network;

the feature extracting network is configured to receive the personal basic information of the multiple users, perform feature extraction on the personal basic information of the multiple users, and output the feature information of the multiple users; and the classification network is configured to receive feature information of the users with the known categories, classify the feature information of the users with the known categories, and output the predicted categories of the users with the known categories.

In a possible implementation, the feature extracting network includes: a similarity relation generating network and a feature generating network;

the similarity relation generating network is configured to receive the personal basic information of the multiple users, generate similarity relations among the multiple users according to the personal basic information of the multiple users, and output the similarity relations among the multiple users; and the feature generating network is configured to receive the similarity relations among the multiple users, update the feature information of the multiple users according to the similarity relations among the multiple users, and output updated feature information of the multiple users.

In a possible implementation, the similarity relation generating network includes: multiple first neural networks and multiple second neural networks, where the first neural networks and the second neural networks are set at intervals;

the first neural networks are configured to receive the personal basic information of the multiple users, generate the similarity relations among the multiple users according to the personal basic information of the multiple users, and output the similarity relations among the multiple users to the second neural networks connected thereto, or to the feature generating network; and the second neural networks are configured to receive the similarity relations among the multiple users, update the personal basic information of the multiple users according to the similarity relations among the multiple users, and output the updated personal basic information of the multiple users to the first neural networks connected thereto.

In a possible implementation, the first neural networks are multilayer perceptron, and the second neural networks are graph convolutional networks.

In a possible implementation, the feature generating network is a graph convolutional network.

In a possible implementation, the classification network is a multilayer perceptron.

Figure 6B:
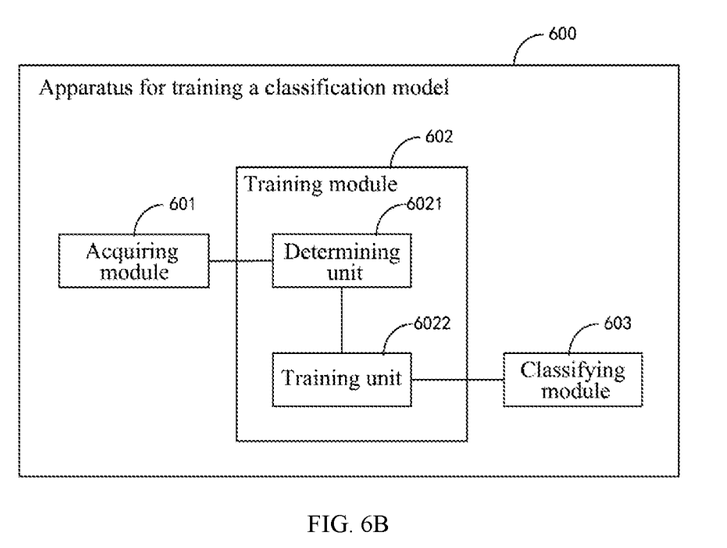
FIG. 6B is a schematic structural diagram of another apparatus for training a classification model provided by the present application.

FIG. 6B is a schematic structural diagram of another apparatus for training a classification model provided by the present application. As shown in FIG. 6B, on the basis of the embodiment shown in FIG. 6A, the training module 602 includes: a determining unit 6021 and a training unit 6022.

The determining unit 6021 is configured to determine a loss of the classification model to be trained according to the behavior information of the multiple users, the feature information of the multiple users, the predicted categories of the users with the known categories, and the real categories of the users with the known categories; and the training unit 6022 is configured to train the classification model to be trained with a goal of minimizing the loss, to obtain the trained classification model.

In a possible implementation, the determining unit 6021 is specifically configured to:

determine a first loss according to the behavior information of the multiple users and the feature information of the multiple users;

determine a second loss according to the predicted categories of the users with the known categories and the real categories of the users with the known categories; and determine the loss of the classification model to be trained according to the first loss and the second loss.

In a possible implementation, the apparatus 600 for training the classification model provided in the present embodiment may further include a classifying module 603. The multiple users include users with unknown categories.

The classifying module 603 is configured to input feature information of the users with the unknown categories into the classification network of the trained classification model to obtain predicted categories of the users with the unknown categories.

The apparatus provided in the present embodiment may be used to execute the method for training the classification model in any of the foregoing method embodiments, and its implementation principles and technical effects are similar, and will not be repeated herein.

Figure 7:
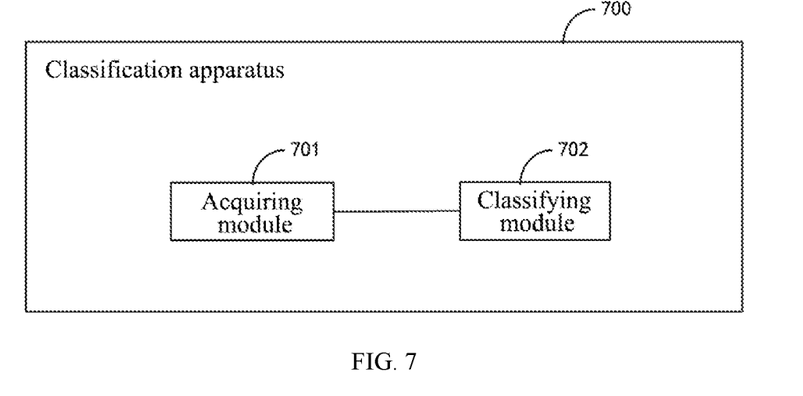
FIG. 7 is a schematic structural diagram of a classification apparatus provided by the present application.

FIG. 7 is a schematic structural diagram of a classification apparatus provided by the present application. The apparatus in the present embodiment may be in a form of software and/or hardware. As shown in FIG. 7, the classification apparatus 700 provided in the present embodiment includes: an acquiring module 701 and a classifying module 702.

The acquiring module 701 is used to acquire feature information of users with unknown categories;

the classification module 702 is configured to input the feature information of the users with the unknown categories into a trained classification model, and determine predicted categories of the users with the unknown categories according to output of the classification model;

where, the trained classification model is obtained by training according to behavior information of multiple users, personal basic information of the multiple users, and real categories of users with known categories; the multiple users includes users with the known categories and the users with the unknown categories, and the feature information of the users with the unknown categories is obtained by learning in a training process of the classification model, the classification model is obtained by training by using the method for training in the above method embodiments.

The apparatus provided in the present embodiment may be used to execute the classification method in the foregoing method embodiments, and its implementation principles and technical effects are similar, and will not be repeated herein.

According to an embodiment of the present application, the present application also provides an electronic device, including: at least one processor; and a memory communicatively connected with the at least one processor; where the memory stores instructions executable by the at least one processor, and the instructions are executed by the at least one processor, to enable the at least one processor to execute the method for training the classification model in the foregoing embodiments, or, the classification method in the foregoing embodiments. The implementation principles and technical effects thereof are similar, and will not be repeated herein.

According to an embodiment of the present application, the present application also provides a non-transitory computer-readable storage medium storing computer instructions, where the computer instructions are used to cause a computer to execute the method for training the classification model in the foregoing embodiments, or the classification method in the foregoing embodiments. The implementation principles and technical effects are similar, and will not be repeated herein.

According to an embodiment of the present application, the present application provides a computer program product including a computer program, the computer program, when executed by a processor, implements the method for training the classification model in the foregoing embodiments, or, the classification method in the foregoing embodiment. The implementation principles and technical effects are similar, and will not be repeated herein.

Figure 8:
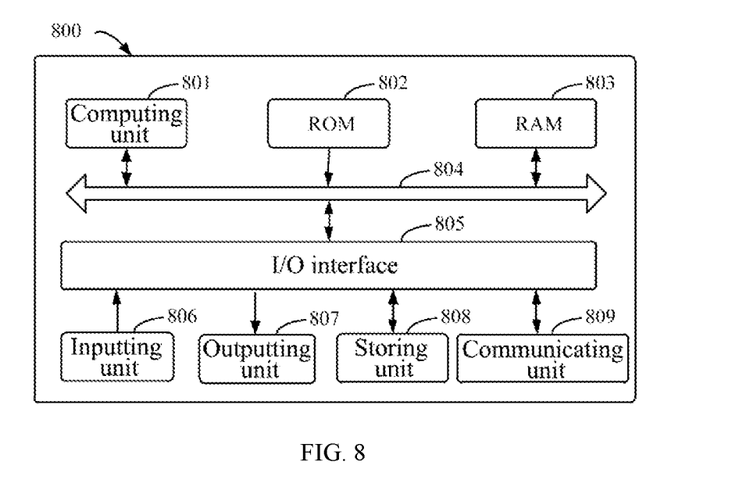
FIG. 8 is a schematic structural diagram of an electronic device provided by the present application.

FIG. 8 shows a schematic block diagram of an example electronic device 800 that may be used to implement embodiments of the present application. The electronic device is intended to represent various forms of digital computers, such as laptop computer, desktop computer, workstation, personal digital assistant, server, blade server, mainframe computer, and other suitable computers. The electronic device may also represent various forms of mobile apparatuses, such as personal digital assistant, cellular phone, smart phone, wearable device and other similar computing apparatuses. The components shown herein, their connections and relationships, and their functions are merely examples, and are not intended to limit the implementations of the present application described and/or claimed herein.

As shown in FIG. 8, the electronic device 800 includes a computing unit 801, which can perform various appropriate actions and processes according to computer programs stored in a read only memory (ROM) 802 or computer programs loaded from a storage unit 808 to a random access memory (RAM) 803. In the RAM 803, various programs and data required when the device operates may also be stored. The computing unit 801, the ROM 802, and the RAM 803 are connected to each other through a bus 804. An input/output (I/O) interface 805 is also connected to the bus 804.

Multiple components in the electronic device 800 are connected to the I/O interface 805, including: an inputting unit 806, for example a keyboard, a mouse, and the like; an outputting unit 807, for example various types of displays, speakers, and the like; a storing unit 808, for example a magnetic disk, an optical disk, and the like; and a communicating unit 809, for example a network card, a modem, a wireless communication transceiver, and the like. The communicating unit 809 allows the device to exchange information/data with other devices through a computer network such as Internet and/or various telecommunication networks.

The computing unit 801 may be various general-purpose and/or dedicated processing components with processing and computing capabilities. Some examples of the computing unit 801 include, but are not limited to, central processing unit (CPU), graphics processing unit (GPU), various dedicated artificial intelligence (AI) computing chips, various computing units that run machine learning model algorithms, digital signal processing (DSP), and any appropriate processor, controller, microcontroller, and the like. The computing unit 801 executes various methods and processes described above, for example the method for training the grade classification model or the grade classification method. For example, in some embodiments, the method for training the grade classification model or the grade classification method may be implemented as a computer software program, which is tangibly contained in a machine-readable medium, for example the storage unit 808. In some embodiments, part or all of the computer programs may be loaded and/or installed on the electronic device 800 via the ROM 802 and/or the communication unit 809. When the computer programs are loaded to the RAM 803 and executed by the computing unit 801, one or more steps of the above-described method for training the grade classification model or the grade classification method may be executed. Alternatively, in other embodiments, the computing unit 801 may be configured to execute the method for training the grade classification model or the grade classification method through any other suitable means (for example, by means of firmware).

The various implementations of systems and technologies described above herein may be implemented in a digital electronic circuit system, an integrated circuit systems, a field programmable gate arrays (FPGA), an application specific integrated circuits (ASIC), an application-specific standard products (ASSP), a system on chip (SOC), a load programmable logic device (CPLD), a computer hardware, a firmware, a software, and/or a combination thereof. These various implementations may include: being implemented in one or more computer programs, the one or more computer programs may be executed and/or interpreted on a programmable system including at least one programmable processor, the programmable processor may be a dedicated or general-purpose programmable processor that can receive data and instructions from a storage system, at least one input apparatus, and at least one output apparatus, and transmit the data and instructions to the storage system, the at least one input apparatus, and the at least one output apparatus.

Program codes used to implement the method of the present application may be written by using any combination of one or more programming languages. These program codes may be provided to processors or controllers of general-purpose computers, dedicated computers, or other programmable data processing apparatuses, so that when the program codes are executed by the processors or controllers, functions/operations specified in the flowcharts and/or block diagrams are implemented. The program codes may be executed entirely on a machine, partially executed on the machine, or partially executed on the machine and partially executed on a remote machine as an independent software package, or entirely executed on the remote machine or a server.

In the context of the present application, a machine-readable medium may be a tangible medium, which may contain or store programs for use by an instruction execution system, an apparatus, or a device or for use in combination with the instruction execution system, the apparatus, or the device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing contents. More specific examples of the machine-readable storage medium would include electrical connections based on one or more wires, portable computer disks, hard disks, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing contents.

To provide interaction with a user, the systems and technologies described herein can be implemented on a computer having: a display apparatus (e.g., a CRT (cathode ray tube) or LCD (liquid crystal display) monitor) for displaying information to the user; and a keyboard and pointing apparatus (e.g., a mouse or a trackball) through which the user can provide input to the computer. Other kinds of apparatuses may also be used to provide interaction with the user; for example, the feedback provided to the user may be any form of sensor feedback (for example, visual feedback, audible feedback, or haptic feedback); and input from the user may be received in any form, including acoustic input, voice input or haptic input.

The systems and technologies described herein can be implemented in a computing system including background components (e.g., as a data server), or a computing system including middleware components (e.g., an application server), or a computing system including front-end components (e.g., a user computer with a graphical user interface or a web browser through which users can interact with implementation of the systems and technologies described herein), or a computing system including any combination of such back-end components, middleware components, or front-end components. The components of the systems can be interconnected by any form or medium of digital data communication (e.g., a communication network). Examples of the communication network include local area network (LAN), wide area network (WAN), and Internet.

The computer system may include a client side and a server. The client side and the server are generally remote from each other and typically interact through a communication network. The relationship between the client side and server is generated by computer programs running on a corresponding computer and having a client side-server relationship with each other. The server may be a cloud server, also be referred as a cloud computing server or a cloud host, which is a host product in a cloud computing service system to solve existing shortcomings of difficult management and weak business scalability in the traditional physical host and VPS service ("Virtual Private Server", or "VPS" for short). The server may also be a server of a distributed system, or a server combined with a block chain.

It should be understood that various forms of processes shown above can be used to reorder, add, or delete steps. For example, various steps recorded in the present application can be executed in parallel, sequentially or in different orders. As long as the desired results of the technical solutions disclosed in the present application can be achieved, there is no limitation herein.

The above-mentioned specific implementations do not constitute a limitation of the protection scope of the present application. It should be understood by those skilled in the art that various modifications, combinations, sub-combinations and substitutions may be made according to design requirements and other factors. Any modification, equivalent replacement, improvement and the like made within the spirit and principle of the present application shall be included within the protection scope of the present application.

What is claimed is:

1. A method for training a classification model, comprising:
   acquiring behavior information of multiple users and personal basic information of the multiple users; wherein categories of at least part of users of the multiple users are known;
   inputting the personal basic information of the multiple users into a classification model to be trained to obtain feature information of the multiple users and predicted categories of users with known categories;
   determining a first loss according to the behavior information of the multiple users and the feature information of the multiple users;
   determining a second loss according to the predicted categories of the users with the known categories and real categories of the users with the known categories;
   determining an end-to-end loss of the classification model to be trained according to the first loss and the second loss; and
   training the classification model to be trained with a goal of minimizing the end-to-end loss to obtain a trained classification model; wherein in a training process, the feature information of the multiple users is updated by using the behavior information of the multiple users.

2. The method according to claim 1, wherein the classification model to be trained comprises: a feature extracting network and a classification network;
   the feature extracting network is configured to receive the personal basic information of the multiple users, perform feature extraction on the personal basic information of the multiple users, and output the feature information of the multiple users; and
   the classification network is configured to receive feature information of the users with the known categories, classify the feature information of the users with the known categories, and output the predicted categories of the users with the known categories.

3. The method according to claim 2, wherein the feature extracting network comprises: a similarity relation generating network and a feature generating network;
   the similarity relation generating network is configured to receive the personal basic information of the multiple users, generate similarity relations among the multiple users according to the personal basic information of the multiple users, and output the similarity relations among the multiple users; and
   the feature generating network is configured to receive the similarity relations among the multiple users, update the feature information of the multiple users according to the similarity relations among the multiple users, and output updated feature information of the multiple users.

4. The method according to claim 3, wherein the similarity relation generating network comprises: multiple first neural networks and multiple second neural networks, wherein the first neural networks and the second neural networks are set at intervals;
   the first neural networks are configured to receive the personal basic information of the multiple users, generate the similarity relations among the multiple users according to the personal basic information of the multiple users, and output the similarity relations among the multiple users to the second neural networks connected thereto, or to the feature generating network; and
   the second neural networks are configured to receive the similarity relations among the multiple users, update the personal basic information of the multiple users according to the similarity relations among the multiple users, and output the updated personal basic information of the multiple users to the first neural networks connected thereto;
   wherein the first neural networks are multilayer perceptron, and the second neural networks are graph convolutional networks.

5. The method according to claim 3, wherein the feature generating network is a graph convolutional network.

6. The method according to claim 2, wherein the classification network is a multilayer perceptron.

7. The method according to claim 2, wherein the multiple users comprise users with unknown categories; after the trained classification model is obtained, the method further comprises:
   inputting feature information of the users with the unknown categories into the classification network of the trained classification model to obtain predicted categories of the users with the unknown categories.

8. A classification method, comprising:
   acquiring feature information of users with unknown categories;
   inputting the feature information of the users with the unknown categories into a trained classification model, and determining predicted categories of the users with the unknown categories according to an output of the classification model;
   wherein, the trained classification model is obtained by training according to behavior information of multiple users, personal basic information of the multiple users, and real categories of users with known categories; the multiple users comprise the users with the known categories and the users with the unknown categories, and the feature information of the users with the unknown categories is obtained by learning in a process of training the classification model, and the classification model is obtained by training by using the method according to claim 1.

9. A classification apparatus, comprising:
   at least one processor; and
   a memory communicatively connected with the at least one processor; wherein,
   the memory stores instructions executable by the at least one processor, and the instructions are executed by the at least one processor, to enable the at least one processor to:
   acquire feature information of users with unknown categories; and
   input the feature information of the users with the unknown categories into a trained classification model, and determine predicted categories of the users with the unknown categories according to an output of the classification model;
   wherein, the trained classification model is obtained by training according to behavior information of multiple users, personal basic information of the multiple users, and real categories of users with known categories; the multiple users comprise users with the known categories and the users with the unknown categories, where the feature information of the users with the unknown categories is obtained by learning in a process of training the classification model, and the classification model is obtained by training by using the method according to claim 1.

10. An electronic device, including:
at least one processor; and
a memory communicatively connected with the at least one processor; wherein,
the memory stores instructions executable by the at least one processor, and the instructions are executed by the at least one processor, to enable the at least one processor to execute the method according to claim 1.

11. A non-transitory computer-readable storage medium storing computer instructions, wherein the computer instructions are used to cause a computer to execute the method according to claim 1.

12. A computer program product comprising a computer program, the computer program, when executed by a processor, implements the method according to claim 1.

13. The method according to claim 1, wherein in the training process, the obtained feature information of the multiple users that is infinitely close to the behavior information of the multiple users is taken as a training target, so as to improve accuracy of the feature information of the multiple users which is obtained by the classification model to be trained.

14. The method according to claim 1, wherein the multiple users are multiple students, the behavior information of the multiple users is learning status information of the multiple students, the feature information of the multiple users is feature information of the multiple students;
the determining the first loss according to the behavior information of the multiple users and the feature information of the multiple users comprises:
determining the first loss according to difference between the learning status information of the multiple students and the feature information of the multiple students.

15. An apparatus for training a classification model, comprising:
at least one processor; and
a memory communicatively connected with the at least one processor; wherein,
the memory stores instructions executable by the at least one processor, and the instructions are executed by the at least one processor, to enable the at least one processor to:
acquire behavior information of multiple users and personal basic information of the multiple users; wherein categories of at least part of users of the multiple users are known;
input the personal basic information of the multiple users into a classification model to be trained to obtain feature information of the multiple users and predicted categories of users with known categories;
determine a first loss according to the behavior information of the multiple users and the feature information of the multiple users;
determine a second loss according to the predicted categories of the users with the known categories and real categories of the users with the known categories;
determine an end-to-end loss of the classification model to be trained according to the first loss and the second loss; and
train the classification model to be trained with a goal of minimizing the end-to-end loss to obtain a trained classification model; wherein in a training process, the feature information of the multiple users is updated by using the behavior information of the multiple users.

16. The apparatus according to claim 15, wherein the classification model to be trained comprises: a feature extracting network and a classification network;
the feature extracting network is configured to receive the personal basic information of the multiple users, perform feature extraction on the personal basic information of the multiple users, and output the feature information of the multiple users; and
the classification network is configured to receive feature information of the users with the known categories, classify the feature information of the users with the known categories, and output the predicted categories of the users with the known categories;
wherein the feature extracting network comprises: a similarity relation generating network and a feature generating network;
the similarity relation generating network is configured to receive the personal basic information of the multiple users, generate similarity relations among the multiple users according to the personal basic information of the multiple users, and output the similarity relations among the multiple users; and
the feature generating network is configured to receive the similarity relations among the multiple users, update the feature information of the multiple users according to the similarity relations among the multiple users, and output updated feature information of the multiple users.

17. The apparatus according to claim 16, wherein the similarity relation generating network comprises: multiple first neural networks and multiple second neural networks, wherein the first neural networks and the second neural networks are set at intervals;
the first neural networks are configured to receive the personal basic information of the multiple users, generate the similarity relations among the multiple users according to the personal basic information of the multiple users, and output the similarity relations among the multiple users to the second neural networks connected thereto, or to the feature generating network; and
the second neural networks are configured to receive the similarity relations among the multiple users, update the personal basic information of the multiple users according to the similarity relations among the multiple users, and output the updated personal basic information of the multiple users to the first neural networks connected thereto;
wherein the first neural networks are multilayer perceptron, and the second neural networks are graph convolutional networks.

18. The apparatus according to claim 16, wherein the feature generating network is a graph convolutional network.

19. The apparatus according to claim 16, wherein the classification network is a multilayer perceptron.

20. The apparatus according to claim 16, wherein the multiple users comprise users with unknown categories; the at least one processor is further enabled to:
input feature information of the users with the unknown categories into the classification network of the trained classification model to obtain predicted categories of the users with the unknown categories.

* * * * *